United States Patent
Skog et al.

(10) Patent No.: US 8,700,784 B2
(45) Date of Patent: Apr. 15, 2014

(54) METHOD AND ARRANGEMENT FOR ENABLING MULTIMEDIA COMMUNICATION WITH A PRIVATE NETWORK

(75) Inventors: Robert Skog, Hässelby (SE); Justus Petersson, Stockholm (SE); Torbjörn Cagenius, Sollentuna (SE); Shingo Murakami, Yokohama (JP)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 466 days.

(21) Appl. No.: 12/513,106

(22) PCT Filed: Dec. 13, 2006

(86) PCT No.: PCT/SE2006/001422
§ 371 (c)(1),
(2), (4) Date: May 28, 2009

(87) PCT Pub. No.: WO2008/054270
PCT Pub. Date: May 8, 2008

(65) Prior Publication Data
US 2010/0070636 A1  Mar. 18, 2010

(30) Foreign Application Priority Data
Oct. 31, 2006 (SE) ...................................... 06/01232

(51) Int. Cl.
*G06F 15/16* (2006.01)
(52) U.S. Cl.
USPC ....................................................... 709/228
(58) Field of Classification Search
USPC ........................... 790/227, 228; 709/227, 228
See application file for complete search history.

(56) References Cited

U.S. PATENT DOCUMENTS

| 7,899,168 | B2* | 3/2011 | Raghav et al. ........... 379/201.01 |
| 7,978,655 | B2* | 7/2011 | Taniuchi et al. ............... 370/331 |
| 2002/0103850 | A1* | 8/2002 | Moyer et al. ................... 709/202 |
| 2002/0165969 | A1* | 11/2002 | Gallant .......................... 709/227 |
| 2002/0191635 | A1* | 12/2002 | Chow et al. .................... 370/463 |
| 2005/0058143 | A1 | 3/2005 | Kikuchi et al. |
| 2005/0240758 | A1* | 10/2005 | Lord et al. ..................... 713/153 |
| 2006/0133392 | A1 | 6/2006 | Ajitomi |
| 2006/0193323 | A1* | 8/2006 | Lee ................................ 370/392 |
| 2006/0203749 | A1* | 9/2006 | Tseng ............................ 370/260 |
| 2009/0083426 | A1 | 3/2009 | Cagenius |
| 2011/0164608 | A1 | 7/2011 | Lindgren |

FOREIGN PATENT DOCUMENTS

| JP | A 2004-171277 | 6/2004 |
| JP | A 2006-295728 | 10/2006 |

* cited by examiner

*Primary Examiner* — John MacIlwinen (57) ABSTRACT

A method and arrangement for enabling access to a home device in a private network from a remote device located outside the private network. The private network includes a multimedia gateway connected to a multimedia service network. A session invite message is sent from the remote device to the multimedia gateway. In response, connection parameters of a residential gateway in the private network are sent to the remote device, which are associated with the selected home device if a home device identification was included in the received message, or with a proxy function in the multimedia gateway capable of providing home device information, if no such identification was included in the received message. In this way, home devices in the private network can be easily and safely accessed remotely.

23 Claims, 6 Drawing Sheets

METHOD AND ARRANGEMENT FOR ENABLING MULTIMEDIA COMMUNICATION WITH A PRIVATE NETWORK

TECHNICAL FIELD

The present invention relates generally to a method and arrangement for enabling multimedia communication with devices connected to a private network by means of a multimedia gateway in the private network.

BACKGROUND

Various communication terminals and devices are available today that are capable of packet-based multimedia communication using IP (Internet Protocol), such as either fixed or mobile computers and telephones. Multimedia services typically entail transmission of encoded data representing media in different formats and combinations. For example, an IP terminal may exchange audio information as well as visual information with another IP terminal, or may download multimedia in any format from a content server.

A network architecture called "IP Multimedia Subsystem" (IMS) has been developed by the 3$^{rd}$ Generation Partnership Project (3GPP) as an open standard for handling multimedia services and sessions in the packet domain. An IMS network basically controls multimedia sessions for IP terminals based on IP transport, regardless of access technology. For example, plural different access networks may be attached to one and the same IMS network.

Figure 1:
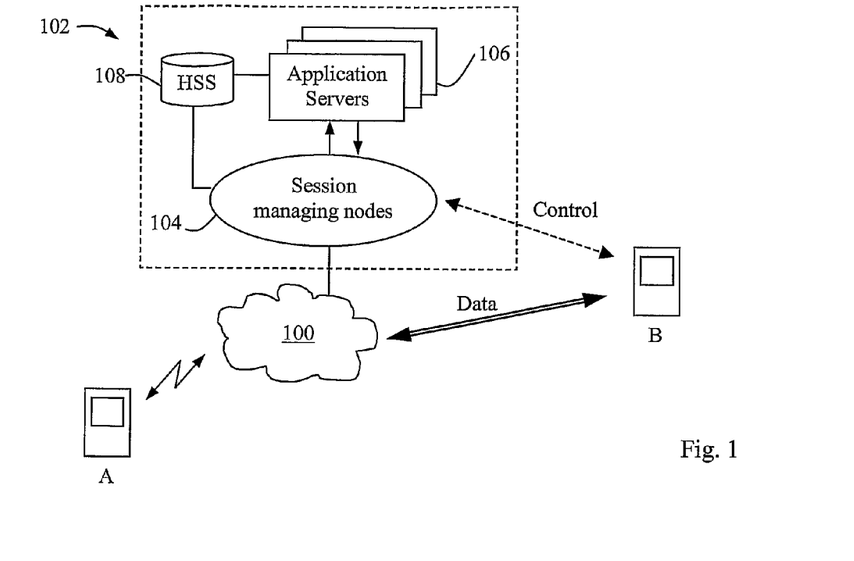
FIG. 1 is a schematic view of a conventional IMS network structure for enabling multimedia communication for a terminal A.

FIG. 1 is an exemplary schematic illustration of a basic network structure for providing multimedia services for a mobile IP terminal A by means of an IMS service network. Terminal A is connected to a radio access network 100 and communicates with another IP terminal B in a communication session involving one or more multimedia services. The radio access network 100 is connected to an IMS network 102 which handles the session with respect to terminal A. Alternatively, terminal A may communicate with a content server for downloading some media content.

The session illustrated in FIG. 1 is managed by specific nodes in the IMS network 102, here generally referred to as "session managing nodes" 104. These nodes typically include S-CSCF (Serving Call Session Control Function), I-CSCF (Interrogating Call Session Control Function) and P-CSCF (Proxy Call Session Control Function). IMS network 102 also includes one or more application servers 106 for enabling various multimedia services and a database element HSS (Home Subscriber Server) 108 storing subscriber and authentication data, among other things. The various functions of network elements 104-108 are generally known in the art and are not necessary to describe here further to understand the context of the present invention.

A signalling protocol called "SIP" (Session Initiation Protocol) is used for controlling sessions in IMS networks. Standard SIP messages can thus be used by IMS systems and IP terminals or devices to establish and control multimedia sessions. For example, a message defined in SIP is called "INVITE" which a terminal can send to another party during a set-up procedure to initiate a session, e.g. when a multimedia application has been invoked in the terminal.

In SIP, an additional protocol is used called "Session Description Protocol SDP", for describing multimedia sessions by means of an SDP message, which can be embedded as a self-contained body within SIP messages. SDP can thus be used by terminals to provide information regarding their specific capabilities and preferences, in order to specify and negotiate session parameters for a forthcoming multimedia session, as is well-known in the art. The above-mentioned SIP INVITE message typically includes the embedded SDP message with information on one or more required codecs (coders/decoders) as well as other communication parameters needed for the session, such as an IP address and a port number.

According to 3GPP, it is required that a subscribing communication terminal accessing an IMS network has access to an SIM (Subscriber Identity Module) application valid for IMS, generally referred to as "ISIM" (IMS SIM), in order to provide necessary authentication and subscriber data to an operator of the IMS network. Today, only such terminals with ISIM capability are allowed to access an IMS network.

An ISIM application is typically installed on a Universal Integrated Circuit Card (UICC), analogous to the well-known SIM card for GSM terminals. Terminals equipped with ISIM are called IMS terminals. Among other things, an ISIM stores an IMS Private Identity referred to as "IMPI" and at least one IMS Public Identity referred to as "IMPU", which are both known to the IMS network. IMPI is used for authentication and is not to be disclosed to third parties, whereas IMPU can be used by anyone to identify subscribers and/or their equipment when participating in IMS services, as analogous to an e-mail address or a telephone number. The intention is that each IMPU is associated with an IMS service profile.

While the IMS concept was primarily conceived to enable multimedia services for mobile IP terminals, it can be used regardless of access technology, as mentioned above. In the European Telecommunications Standards Institute (ETSI), a working group called TISPAN (Telecom and Internet Services and Protocols for Advanced Networks) is currently working with the adoption of IMS in fixed networks. It is now also desirable to provide such IMS-based services for a variety of IP terminals connected to a local or private network, particularly a residential or office network environment using, e.g., conventional LAN (Local Area Network) equipment and protocols. The generic term "private network" will be used in the following description to represent any such networks, including LAN, WAN (Wide Area Network) and WLAN (Wireless Local Area Network). Further, the term "home device" will be used for any terminal within the private network capable of IP communication.

A private network may include fixed or wireless communication devices that are not IMS enabled, even though they may be "SIP enabled", while other communication devices in the private network may be neither IMS enabled nor SIP enabled. For example, such plain devices may include fixed and cordless telephones, as well as PC's and so-called Set Top Boxes (STB) for television sets. The large amount of such existing devices makes it desirable to provide for an interworking solution between non-IMS devices and the IMS network, to enhance the market for multimedia services.

In order to provide IMS services to non-IMS enabled devices in a private network, a multimedia gateway referred to as a "Home IMS Gateway, HIG", has been defined that can act as an IMS enabled terminal on behalf of any home device in the private network. This type of Home IMS Gateway is described in WO 2006/045706 (Telefonaktiebolaget LM Ericsson). Among other things, the HIG includes an SIP "Back-to-Back User Agent" (B2BUA) for communications between SIP enabled but non-IMS enabled devices and the IMS network. The B2BUA is equipped with an ISIM application and handles IMS signalling on behalf of SIP devices, such that all signalling concerning an SIP device is associated with the corresponding IMPI on the ISIM application. For example, an SIP enabled home device may send an SIP REGISTER message to the HIG, containing only an SIP identity. The HIG will then translate the message into an IMS REGISTER message that contains both an IMPI and an IMPU, according to regular IMS procedures.

Figure 2:
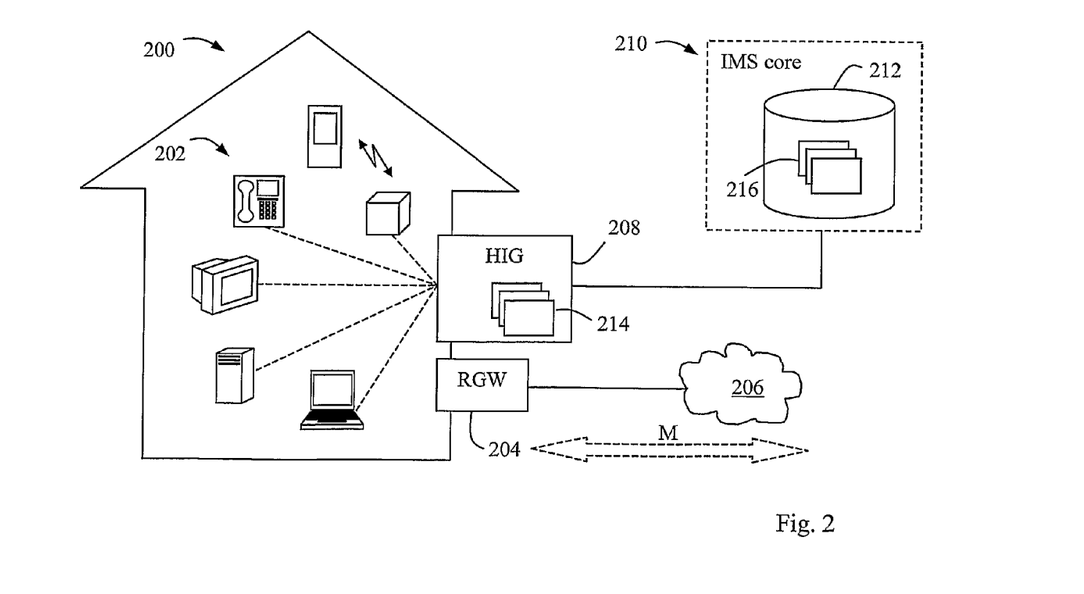
FIG. 2 is a schematic view of a residential/private network with access to multimedia services by means of a local "Home IMS Gateway HIG", according to the prior art.

A typical scenario for using the HIG is generally outlined in FIG. 2, illustrating a private or "home" environment 200, such as a family residence or an office, that contains a plurality of different home devices linked together in a private network 202. As illustrated here, these devices may include a wireline telephone, a cordless telephone, a TV set, a server and a PC, and these will be simply referred to as "home devices" hereafter.

The private network 202 includes a conventional residential gateway RGW 204 which is connected to an external access network 206, providing a communication link for media M to and from the devices in network 202. Although not specifically illustrated here, the RGW 204 typically includes NAT (Network Address Translation) and firewall functions, and also a local DHCP (Dynamic Host Configuration Protocol) server providing private IP addresses to the devices, as is well-known in the art.

The private network 202 further includes an HIG 208 providing a connection to an IMS network, here represented as an IMS core 210 containing an HSS 212, among other things. The HIG 208 is equipped with interfaces towards the different types of devices for signalling, using device-specific protocols. In the above-mentioned document WO 2006/045706, the basic functional HIG architecture, including various interfaces, protocol translation and gateway functions, is described in detail. In practice, the described HIG functionality may be implemented as a separate node, or in an RGW, or even in an IMS enabled terminal. However, it is considered as a separate functional unit in this description regardless of implementation.

In the HIG 208, identity information 214 is stored for each of the devices in the private network 202, typically including the above-mentioned IMPU, which is valid for accessing the IMS core 210 where the same identity information is also stored as subscriber information 216 in the HSS 212, as indicated in the figure. The above-mentioned WO 2006/045706 outlines how different combinations of IMPI and IMPU can be used in this context. Thus, each home device in network 202 has been assigned a local identity that is associated with a specific IMS identity such as an IMPU used for representing one or more devices, or the IMPU of HIG. The identity information 214 is typically stored in an ISIM application implemented in the HIG 208.

Thus, when a device in network 202 sends a request for an IMS service, using a protocol within its capability, HIG 208 identifies the device by means of its local IP address, and retrieves the corresponding IMS identity 214 of the device itself or of the user logged on to that device. Then, HIG 208 can translate the received service request and create a valid SIP-based IMS request (e.g. SIP INVITE) on behalf of the device, using the retrieved IMS identity 214. HIG 208 will then set up a session for the device by communicating suitable SIP messages with the IMS core 210, accordingly.

In a similar manner, an incoming call involving an IMS service, which may be addressed to one of the devices or generally to the private home or office, can be set up by the HIG on behalf of a device using an IMS identity 214 associated with the device or HIG 208. The call can then be routed to the called device over the RGW 204 in order to communicate media M. In this way, the IMS core will perceive the device in network 202 as an IMS enabled device, even when this is not the case, and the device will use the HIG 208 as a proxy for accessing services offered by means of the IMS network.

The IMS network operator typically hands out IMS identities which are registered in the IMS network as subscriber information stored in the HSS 212. According to different alternatives, a valid IMS identity and necessary authentication data may be registered in the HIG for each home device in network 202, or one or more common IMS identities may be shared by plural home devices for use on a session basis.

Non-IMS devices may communicate by means of the HIG 208 using an architecture according to UPnP (Universal Plug-and-Play) which is developed in a multi-vendor collaboration for establishing standard device control protocols. UPnP thus provides peer-to-peer connectivity for communication between any types of devices in a private network, regardless of access technology, operating system, programming language, format standard and communication protocol of the device. The UPnP technology is based on Internet standards such as IP, TCP, UDP, HTTP, and XML, and can use any transport medium such as a telephone line, Ethernet and different types of wireless. UPnP defines base protocol sets for each type of device.

Further, UPnP supports an automatic "discovery" process, also referred to as "pairing". Using the discovery process, a home device can dynamically join a private network, obtain a private IP address, announce its name and IP address, and provide its capabilities to other devices upon request. In this way, each home device in the private network can also obtain information on the presence and capabilities of other devices in the network.

DLNA (Digital Living Network Alliance) is a new technology developed by leading manufacturers of electronic consumer equipment for acquiring, storing and accessing digital content from any devices in a home network, e.g. music, films and images. Such DLNA devices incorporate a networking component called "Device and Service Discovery and Control" for automatic self-configuration of networking properties such as private IP addresses i.e. the above-mentioned discovery functionality. To accomplish this, DLNA uses a standardised UPnP protocol according to the UPnP Device Architecture, Version 1, providing simple and effective device networking in the home.

In addition to the communication of different home devices within the private network, it is also desirable to access the private network remotely, i.e. such that a remote device located outside the private network can communicate with home devices within the private network, in the same manner as when located inside. In WO 2006/079891 (Nokia), a solution is described for setting up a VPN (Virtual Private Network) tunnel as a data transport channel for remote UPnP access, e.g. using IPSec (IP Security). Presumably, DLNA will utilize the UPnP remote access architecture to also allow remote DLNA devices to access the home network.

However, home devices in a private network use private IP-addresses (e.g. 10.0.x.x, 192.168.x.x and 172.x.x.x) for communication within the network. Such local network addresses can only be used for routing inside the private network. Once a home device has executed the discovery process in a private network when located inside the network, it has knowledge of the IP-address, name and capabilities of other home devices. Using this knowledge, these devices can exchange media content inside but not outside the private network. Thus, should the home device move out of the private network and connect to some public access network, it can no longer interact with the other home devices in this manner.

The solution for remote access described in the above-mentioned WO 2006/079891 requires the use of IP address resolution based on FQDN (Fully Qualified Domain Name) and dynamic DNS (Domain Name server) technology. Therefore, it is necessary to have access to a dynamic DNS client in the private network. Moreover, this solution is "device centric" by authenticating the current device being used, rather than the user of that device.

SUMMARY

It is an object of the present invention to address the problems outlined above. More specifically, it is an object of the present invention to make it possible to access home devices in a private network from a remote device located outside the private network, without requiring IP address resolution functionality. These objects and others can be obtained by providing methods and arrangements according to the independent claims attached below.

According to one aspect, a method is provided in a remote device for accessing a home device in a private network from the remote device when located outside the private network, wherein the private network includes a multimedia gateway connected to a multimedia service network. A session invite message directed to the multimedia gateway is sent over the multimedia service network, optionally including an identification of a selected home device if available in the remote device. Connection parameters of a residential gateway in the private network are then received from the multimedia gateway in response to the session invite message. The received connection parameters are associated with the selected home device if a home device identification was included in the session invite message, or with a proxy function in the multimedia gateway capable of providing home device information, if no home device identification was included in the session invite message. The connection parameters are then used to communicate media with the selected home device or to obtain home device information from the proxy function.

According to another aspect, an arrangement is provided in a remote device located outside a private network, for accessing a home device in the private network, wherein the private network includes a multimedia gateway connected to a multimedia service network. The inventive remote device arrangement comprises means for sending a session invite message directed to the multimedia gateway over the multimedia service network, optionally including an identification of a selected home device if available in the remote device. The remote device arrangement further comprises means for receiving connection parameters of a residential gateway in the private network from the multimedia gateway for communication with a selected home device in response to the session invite message. The received connection parameters are associated with the selected home device if a home device identification was included in the session invite message, or with a proxy function in the multimedia gateway capable of providing home device information, if no home device identification was included in the session invite message. The remote device arrangement further comprises means for using the connection parameters to communicate media with the selected home device or to obtain home device information from the proxy function.

By implementing the invented method and arrangement above in the remote device, home devices in a private network can be easily and safely accessed when located outside the private network, without requiring IP address resolution functionality.

The invented method and arrangement in the remote device may optionally have the following further characteristics.

The received connection parameters preferably include a network address/port number combination that can be used for routing outside the private network.

The selected home device identification can be included in the session invite message, if the remote device has obtained the home device identification in a discovery process executed previously when located inside the private network.

The session invite message may be a regular SIP INVITE message and the home device identification may be included in an SDP message embedded in the SIP INVITE message, or included in a "To:" field in the SIP header.

If no home device identification was included in the session invite message, a VPN tunnel can be established with the private network to the proxy function for synchronising with the proxy function to obtain information on home devices in the private network. The VPN tunnel can also be used for communication with a selected home device.

According to yet another aspect, a method is provided in a multimedia gateway in a private network and being connected to a multimedia service network, to enable access to a home device in the private network from a remote device located outside the private network. A session invite message is received from the remote device over the multimedia service network, optionally including an identification of a selected home device. Connection parameters of a residential gateway in the private network are then established for communication with the remote device. These connection parameters are associated with the selected home device if a home device identification was included in the session invite message, or with a proxy function in the multimedia gateway capable of providing home device information, if no home device identification was included in the session invite message. The established connection parameters are then sent to the remote device in response to the received session invite message.

According to yet another aspect, an arrangement is provided in a multimedia gateway in a private network, for enabling access to a home device from a remote device located outside the private network, the multimedia gateway being connected to a multimedia service network. The inventive multimedia gateway arrangement comprises means for receiving a session invite message from the remote device over the multimedia service network, optionally including an identification of a selected home device. The multimedia gateway arrangement further comprises means for establishing connection parameters of a residential gateway in the private network for communication with the remote device. These connection parameters are associated with the selected home device if a home device identification was included in the session invite message, or with a proxy function in the multimedia gateway capable of providing home device information, if no home device identification was included in the session invite message. The multimedia gateway arrangement further comprises means for sending the established connection parameters to the remote device in response to the received session invite message.

By implementing the invented method and arrangement above in the multimedia gateway, the remote device can, when located outside the private network, easily and safely access home devices in the private network, without requiring IP address resolution functionality.

The invented method and arrangement in the multimedia gateway may optionally have the following further characteristics.

The established connection parameters preferably include a network address/port number combination that can be used for routing outside the private network.

The received session invite message may be a regular SIP INVITE message, and in that case a 200 OK message is sent as a response with the connection parameters included either in an SDP message embedded in the 200 OK message, or included in a "To:" field in the SIP header of the 200 OK message.

Alternatively, if no home device identification was included in the received session invite message, a VPN tunnel may be established with the remote device to the proxy function, for synchronising with the remote device to provide information on home devices in the private network.

Further possible features and benefits of the present invention will be explained in the detailed description below.

BRIEF DESCRIPTION OF THE DRAWINGS

The present invention will now be described in more detail by means of preferred embodiments and with reference to the accompanying drawings, in which.

DETAILED DESCRIPTION

Briefly described, the present invention enables multimedia communication with home devices in a private network for a remote device located outside the private network, by utilising standard session setup messages in a multimedia service network to obtain a connection in a multimedia gateway between the remote device and a selected home device.

In this description, the multimedia gateway will be referred to as an HIG connected to an IMS network, and the term UPnP will be used to represent the private network architecture. However, the present invention is basically not limited to these specific terms, nor to any specific protocols and standards referred to in the following.

Figure 3:
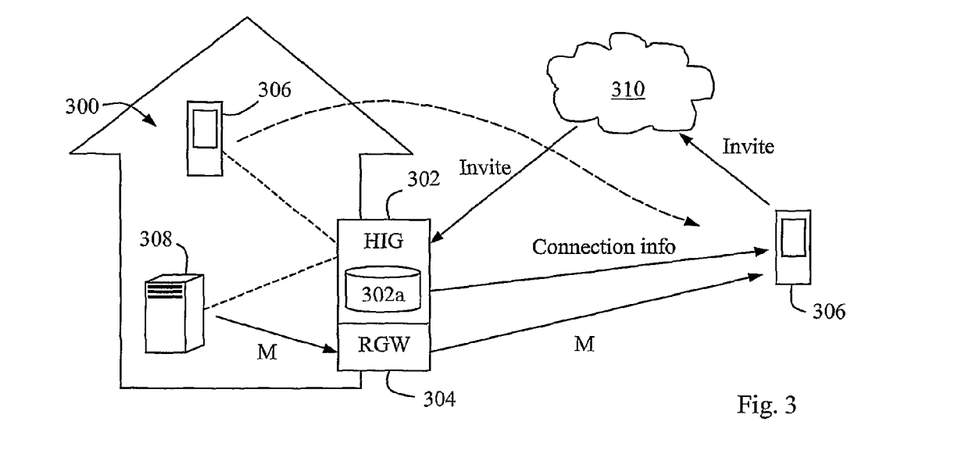
FIG. 3 is a schematic scenario for accessing a home device from a remote device, in accordance with one embodiment.

FIG. 3 illustrates a schematic scenario example of a private network 300 comprising a multimedia gateway HIG 302 for controlling multimedia services, and a residential gateway RGW 304 for the transport of data and media. Two home devices are shown in the private network 300, namely a wireless terminal 306 and a media server 308, although further home devices may well be present in network 300.

In this example, the wireless terminal 306 moves outside the private network, as indicated by a dashed arrow, and is then connected to a public access network, not shown. Thereby, the wireless terminal 306 becomes a remote device relative the private network 300 in this context. In this solution, it is a precondition that both the remote device 306 and HIG 302 have been registered as clients in a multimedia service network 310, such as an IMS network. Further, the remote device 306 is equipped with a specific application adapted for remotely accessing home devices in the private network, which will be generally referred to as a "Home Device Access Client, HDAC" in the following description. The HDAC application may also be adapted to check whether the remote device 306 is currently connected to the private network or not.

After a user has activated the HDAC in remote device 306, a session invite message is sent, such as a regular SIP INVITE message, directed to HIG 302 in network 300, e.g. using IMPU identities. A specific IMPU identity in HIG 302 may be defined for accessing HIG 302 remotely. Existing mechanisms are then utilised for establishing a multimedia session with HIG 302, and the session can be used for accessing a selected home device in the network. Alternatively, the session can be used for accessing a proxy function in HIG to access the private network in general and to obtain home device information from the proxy function in a synchronisation process.

HIG 302 then responds by establishing connection parameters in RGW 304, including an IP address/port number combination, which then can be used for communication with a selected home device or with a proxy function in HIG 302. The connection parameters are then sent over to the remote device 306, preferably included in a regular session setup message in response to the session invite message. For example, The connection parameters may be included in an SDP message conventionally embedded an SIP 200 OK message, being a regular response message to the SIP INVITE.

In this example, the user wants to access the media server 308 in order to fetch some media content therefrom, e.g. music or images, for playout or display on the device 306. If the remote device 306 has executed a discovery process previously when located in the private network 300, device information is already stored in the remote device 306, such as names, device identities and device capabilities, being available to the user for device selection. The user may even browse for media content stored in the home devices, if such supplemental information was exchanged in the discovery process and stored in the device 306.

If home device information is available in the remote device, a list of home devices may be presented on a display screen to the user for selection. Depending on the implementation, the user may select a home device for communication before activating the HDAC in device 306. If the user in this way selects home device 308 before the session invite message is sent, the HDAC in device 306 will, when activated, include an identification of the selected home device 308 in that message, e.g. in an SDP message embedded in an SIP INVITE message. The home device identification may also be included in the header of that message, e.g. the "To:" field in the SIP header. The home device identification may be a name, a private network address (e.g. an IP address or a MAC (Media Access Control) address), a UUID (Universally Unique Identifier), or any other device identification recognized in the private network 300.

On the other hand, if no home device information is available in the remote device 306, the home device information can be obtained from the HIG 302 after receiving the connection parameters including a network address and port number. In that case, the HDAC in device 306 will of course send a "plain" session invite message without an identification of any home device, where the term "plain" is merely used to indicate the lack of such a home device identification. However, an identification of the above-mentioned proxy function in HIG 302 may be included in the plain session invite message.

Being a part of the private network 300, it is assumed that HIG 302 participates in any executed discovery processes, and has therefore acquired home device information previously that has been stored in a device database 302a or the like. The discovery process may be executed by a UPnP proxy function in the HIG. Thus, HIG 302 will send valid information on the home devices to the remote device 306, including their names, device identities and capabilities, in response to the session invite message. The user can then select a home device for communication.

Figure 4:
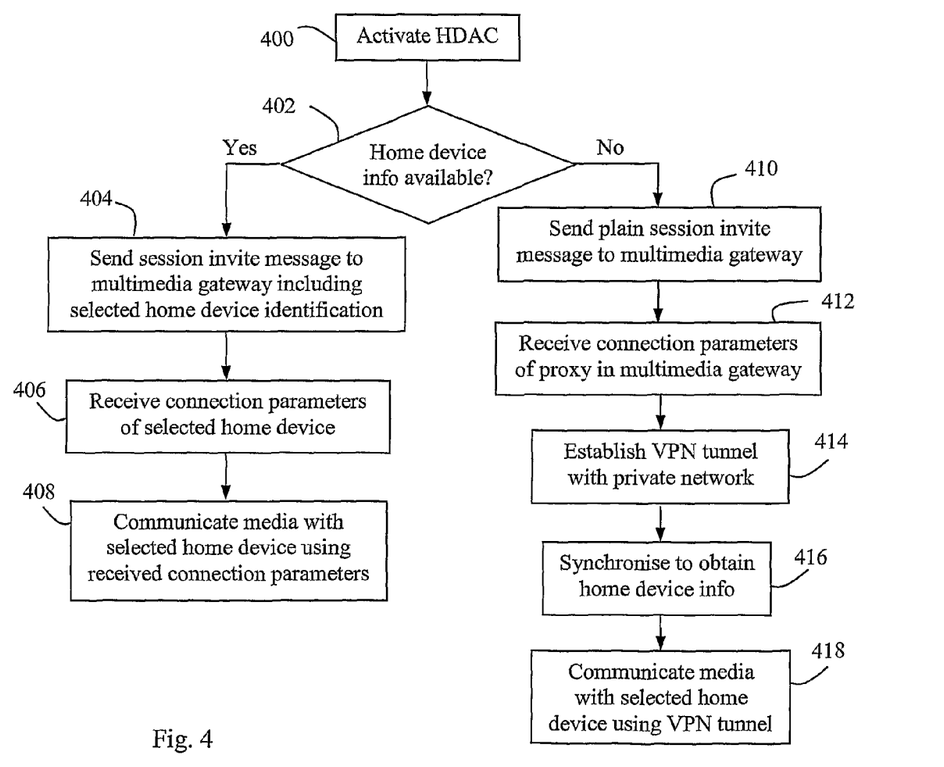
FIG. 4 is a flow chart with steps performed by a remote device for communicating multimedia content with a home device in a private network, in accordance with another embodiment.

FIG. 4 is a flow chart with steps performed by a remote device for communicating multimedia content, here called "media" for short, with a home device in a private network, in accordance with another embodiment. The private network also comprises a multimedia gateway and a residential gateway. By way of example, the remote device, the home device, the multimedia gateway and the residential gateway in this process may be the wireless terminal 306, the media server 308, the HIG 302 and the RGW 304, respectively, described for FIG. 3.

In a first step 400, an HDAC in the remote device is activated in response to some suitable user input such as pressing a button or the equivalent. As mentioned above, the remote device may send a session invite message to the multimedia gateway in response to the activation of HDAC, or after the user has selected a specific home device for communication. For example, if home device information is available in the remote device, a list of home devices may be presented on a display screen to the user for selection. If not available, a plain session invite message may be initiated by the user or HDAC, which will be described in more detail below.

In a next step 402, the process is basically divided into two different branches depending on whether any home device information is available in the remote device or not. As mentioned above, the remote device may have executed a discovery process previously to obtain and store home device information which is still valid in some respect. In one possible implementation, for example, the remote device may have done the discovery process relatively recently, whereby the stored home device information can be deemed valid. However, if a predetermined time period has elapsed after the latest discovery process, any stored home device information may be deemed out of date. Another possible situation is that the remote device has actually never been present in the private network and has thus never made any discovery process, thereby having no stored home device information whatsoever.

Thus, in the former case when valid home device information is available in the remote device ("yes" in step 402), a session invite message is sent to the multimedia gateway in a step 404, including an identification of a home device that has been selected for communication by the user, as described above. In response to the session invite message of step 404, connection parameters in the residential gateway associated with the selected home device are received from the multimedia gateway, as illustrated in a step 406. The received connection parameters preferably include at least an IP address/port number combination in the residential gateway.

The connection parameters received in step 406 are then used for the communication of media with the associated home device, in a step 408. As the given connection parameters have been associated with the selected home device in the residential gateway, any messages or data from the remote device addressed those connection parameters will thus be directed to the selected device. It should be noted that the received connection parameters in the residential gateway can be used for routing outside the private network, whereas the private IP addresses of home devices can not.

On the other hand, if no valid home device information is available in the remote device ("no" in step 402), a "plain" session invite message with no specific home device identification is sent to the multimedia gateway in a step 410, although it may contain an identification pointing to a proxy function in the multimedia gateway, as mentioned above. In response to the plain session invite message of step 410, connection parameters in the residential gateway associated with the proxy function in the multimedia gateway are received from the multimedia gateway, as illustrated in a step 412.

The proxy function is capable of providing home device information to the remote device, by having executing a discovery process to obtain valid information on home devices in the private network, and may be a UPnP proxy as described above. The proxy function thus continuously gathers such information from the home devices during the discovery process, preferably including their names, device identities and capabilities.

The connection parameters received in step 412 can be used for communication with the proxy function and preferably includes at least an IP address/port number combination in the residential gateway, to which any following messages and requests can be addressed when communicating with the proxy function. It should be noted that the received connection parameters in the residential gateway can be used for routing outside the private network, whereas the private IP addresses of home devices can not.

In a following step 414, a VPN tunnel (e.g. IPSec) is established with the private network to the proxy function in the multimedia gateway, using the received IP address and port number of that proxy. The established VPN tunnel is then used to synchronise with the proxy function to obtain home device information in a further step 416, to discover devices and services in the private network. When receiving the home device information, the home devices are preferably displayed on the remote device in a suitable manner, and the user can then select a home device for communication by means of a suitable input command.

Finally, the remote device can communicate media with the selected home device in a last illustrated step 418, using the VPN tunnel established in step 414. Thereby, a home device can be selected at the remote device and sensitive information and data can be safely exchanged using the VPN tunnel, basically in the same manner as if the remote device was actually located within the private network, e.g. using the UPnP protocol. Alternatively, once the home device information is available in the remote device after step 416, the present VPN tunnel may be closed and a session invite message including a selected home device identification may be sent to the multimedia gateway at some point later according to step 404 and onwards, thereby following the left branch of the flow chart.

Figure 5:
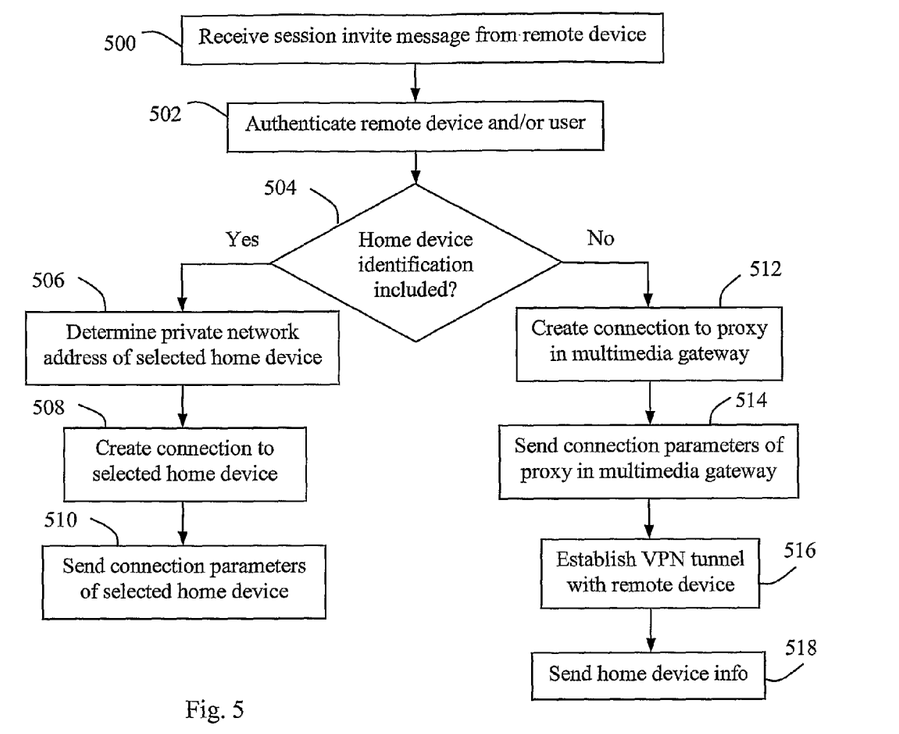
FIG. 5 is a flow chart with steps performed by a multimedia gateway for setting up a multimedia session between a remote device and a home device in a private network, in accordance with another embodiment.

FIG. 5 is a flow chart with steps performed by a multimedia gateway for enabling a multimedia session between a remote device and a home device in a private network, in accordance with another embodiment. This process basically corresponds to the process taking place in the remote device described in FIG. 4 above, wherein the same components and conditions generally pertain also in FIG. 5 and will not be described again here.

In a first step 500, a session invite message is received from the remote device, which may or may not contain a home device identification, see below. In response thereto, the multimedia gateway preferably authenticates the remote device and/or its user, in a following step 502.

Next, it is determined in a step 504 whether any home device identification is included in the received session invite message to indicate a selected home device for communication. As mentioned above, the remote device may or may not include a home device identification in the session invite message, depending on its availability in the remote device.

If a home device identification is included, ("yes" in step 504), the private network address of the selected home device is determined in a step 506, based on the included home device identification. If a name or similar is used as the home device identification, the corresponding private IP-address of the device can be found in a device database or the like in the multimedia gateway. As mentioned above, the home device identification may actually be its private network address, and verification thereof is made in this step in that case.

Thereafter, a connection to the selected home device is created in a step 508, e.g. by establishing a NAT binding in the residential gateway between the IP address/port number of the remote device and an IP address/port number associated with the selected home device.

In a next step 510, connection parameters in the residential gateway associated with the selected home device are sent to the remote device, which step corresponds to step 406 in FIG. 4. The connection parameters preferably include at least the IP address/port number in the residential gateway reserved for the remote device according to the NAT binding. The remote device can then use those connection parameters to communicate any messages or data with the selected home device, which thus can be routed outside the private network.

On the other hand, if a plain session invite message is received including no home device identification, ("no" in step 504), a connection to a proxy function in the multimedia gateway is created in the residential gateway, in a step 512, e.g. by establishing a NAT binding in the residential gateway between the IP address/port number of the remote device and an IP address/port number associated with the proxy function. In the same way as described above for FIG. 4, the proxy function is capable of executing a discovery process to obtain valid information on home devices in the private network, and may be a UPnP proxy.

In a next step 514, corresponding to step 412 in FIG. 4, connection parameters in the residential gateway associated with the proxy function are sent to the remote device, preferably including at least the IP address/port number in the residential gateway reserved for the remote device. The remote device can then use those connection parameters to communicate any messages or data with the proxy function, which thus can be routed outside the private network.

In a following step 516, a VPN tunnel (e.g. IPSec) is established with the remote device to the proxy function in the multimedia gateway, using the sent IP address and port number of that proxy. The established VPN tunnel is then used for the synchronisation process to provide home device information to the remote device in a further step 518, to reveal devices and services in the private network. The remote device user can then select a home device for communication, which is not illustrated further in this figure.

Figure 6:
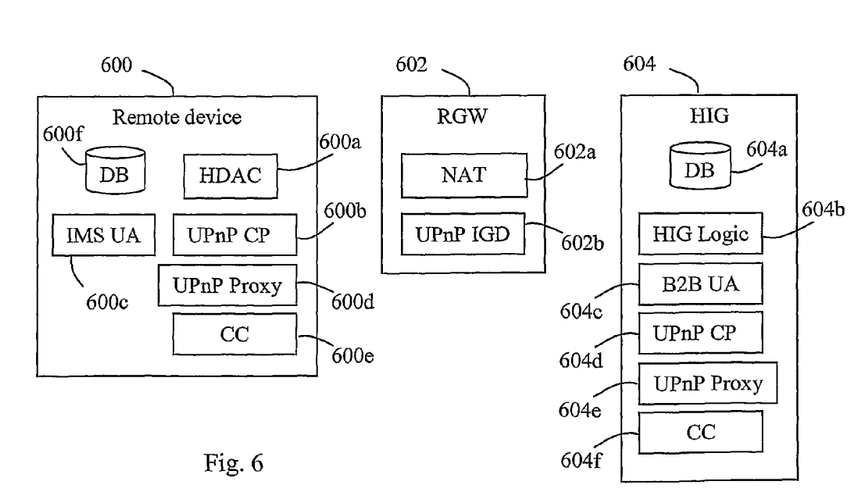
FIG. 6 is a schematic block diagram illustrating functional architectures of a remote device, a residential gateway RGW and a multimedia gateway HIG, in accordance with another embodiment.

FIG. 6 is a schematic block diagram illustrating an example of how different functions for accomplishing the above-described solution can be implemented in a remote device 600 on one side, and in a residential gateway RGW 602 and a multimedia gateway HIG 604 of a private network on the other side. The multimedia gateway HIG 604 is connected to an IMS network, not shown, and both HIG 604 and the remote device 600 have been registered as IMS clients. It should be noted that FIG. 6 illustrates the different structures purely logically, and the skilled person will be able to implement these functions in practice by means of any suitable hardware and software.

The remote device 600 comprises an HDAC application 600a for interacting with home devices (not shown) in the private network. When device 600 is present in the private network, it functions as a home device using a UPnP CP (Control Point) 600b for connectivity and device discovery. When outside the private network, an IMS UA (User Agent) 600c is used to obtain connection parameters of the RGW 602 (e.g. a routable IP address/port number combination) for communication with home devices in the private network. A UPnP proxy 600d is used to synchronize UPnP discovery messages between the remote device and the home network, and a CC (connectivity client) 600e is used to establish a connection based on the IP address of the RGW 602, which can be retrieved by means of regular SIP messages over IMS, as described above. The remote device 600 may also comprise a database or the like 600f, for storing home device information.

The RGW 602 is a conventional residential gateway comprising a NAT function 602a and a UPnP Internet Gateway Device IGD 602b, for controlling the NAT IP address and port mapping.

The HIG 604 comprises a client DB (database) 604a containing private IP addresses of home devices and where home device information is also gathered by means of a discovery process or similar, as described above. The discovery information of home devices stored in client DB 604a may also include names and capabilities of the devices. The private IP addresses and discovery information of home devices may also be stored in separate databases, depending on the implementation. The HIG 604 further comprises an HIG logic function 604b and a B2B UA (Back-to-Back User Agent) 604c for communications between home devices and the IMS network.

HIG 604 thus supports remote access according to the above-described examples by implementing a UPnP CP 604d, a UPnP Proxy 604e and a CC 604f, corresponding to the UPnP CP 600b, the UPnP Proxy 600d and connectivity client 600e of the remote device 600, respectively. The UPnP Proxy 604e can be utilised for conveying, e.g., multicast UPnP discovery messages to the remote device 600, in order to facilitate the synchronisation of the UPnP discovery information.

Figure 7:
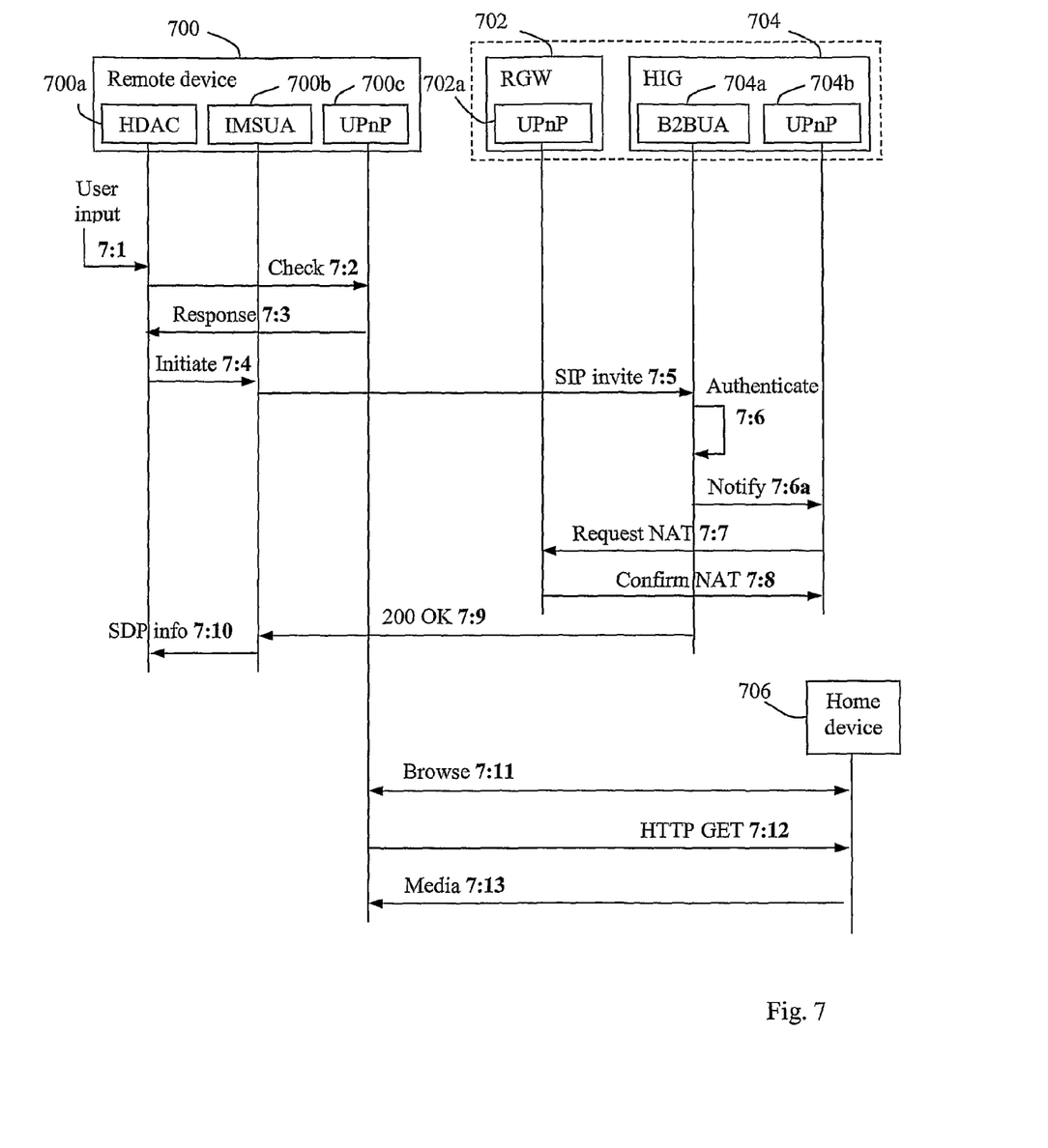
FIG. 7 is a signalling diagram for obtaining remote access from a remote device to a home device in a private network, when home device information is available in the remote device, in accordance with another embodiment.
Figure 8:
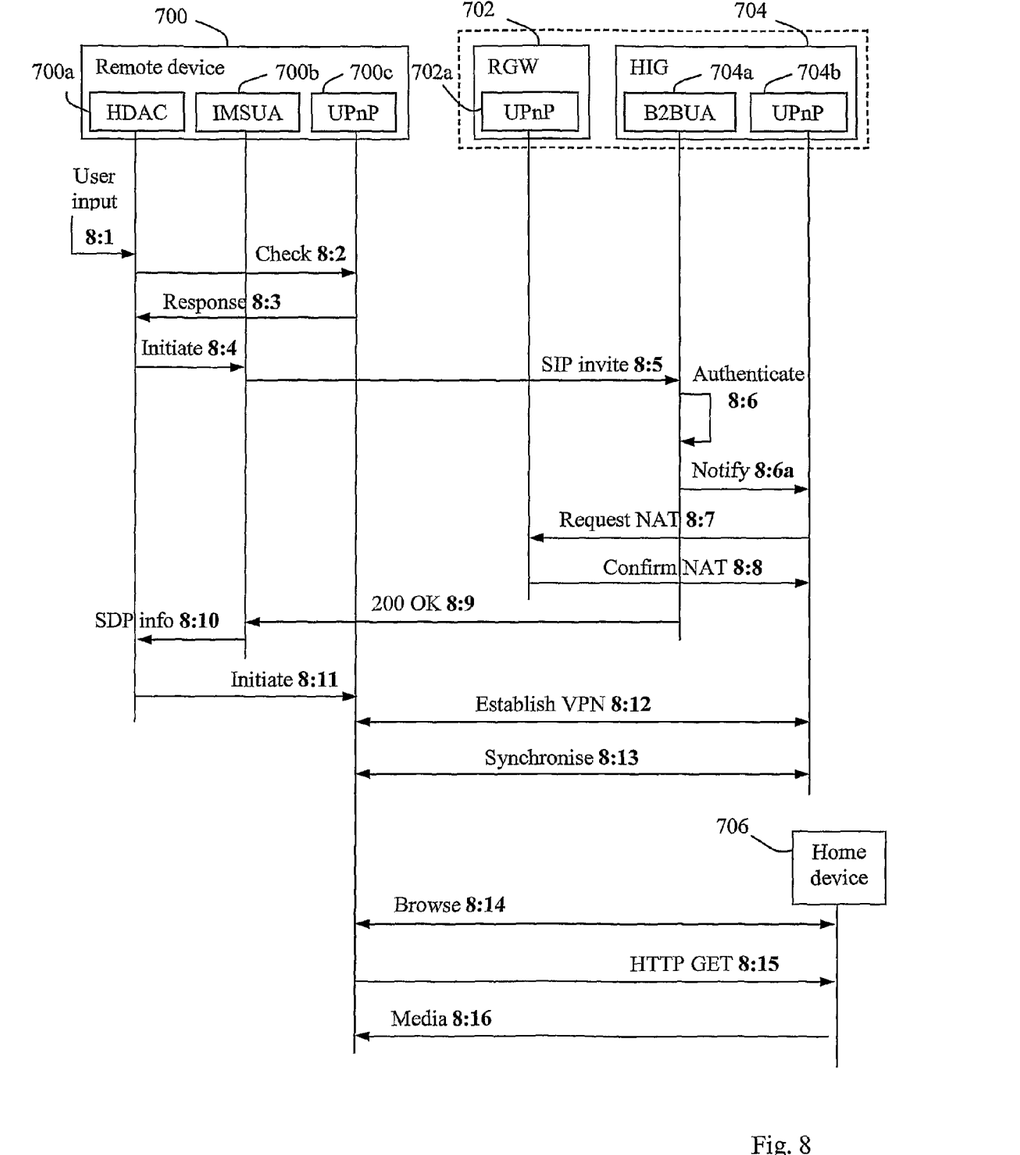
FIG. 8 is a signalling diagram for obtaining remote access from a remote device to a home device in a private network, when home device information is not available in the remote device, in accordance with another embodiment.

FIG. 7 and FIG. 8, respectively, illustrate in more detail how a signalling procedure between different nodes and components can be implemented according to further embodiments, to achieve remote access to a home device 706 from a remote device 700 by means of a residential gateway RGW 702 and a multimedia gateway HIG 704, basically as explained above. Again, it is a pre-condition that both the remote device 700 and the HIG 704 have been registered as IMS clients.

The following signalling steps are thus somewhat different depending on whether the remote device is synchronized with the private network or not, i.e. whether the remote device has any information on home devices and services on the private network, e.g. obtained in a discovery process when located within the network previously. This may not be the case if new devices have been added to the private network, or when using a remote device that has never entered the private network. In FIG. 7, valid home device information is available in the remote device from the start, whereas in FIG. 8, it is not.

In both FIG. 7 and FIG. 8, the remote device 700 comprises a client application HDAC 700a for accessing home devices, a user agent IMS UA 700b for communication over an IMS network, and an application UPnP 700c for communication between home devices within a private network. Further, RGW 702 comprises a corresponding UPnP application 702a, and HIG 704 comprises a user agent B2BUA 704a providing an interface between home devices and the IMS network, and a corresponding UPnP application 704b. The UPnP applications 700c and 704b both contain control point and proxy functions as described for FIG. 6 above.

The case when valid home device information is available in the remote device will now be described, referring to FIG. 7. In a first step 7:1, a user wanting to access a home device from the remote device 700 activates the HDAC 700a, which can be done in the same manner when located either inside or outside the private network. As mentioned above, the user may have selected home device 706 before activating the HDAC in step 7:1.

In a next step 7:2, HDAC 700a basically checks with the control point function of UPnP 700c whether the remote device 700 is currently connected to and located inside the private network, or not. In response thereto, UPnP 700c replies in a step 7:3 basically either "yes" (inside, connected) or "no" (outside, connect remotely).

In a following step 7:4, HDAC 700a initiates the IMS UA 700b to send an IMS-based SIP INVITE as a session invite message, in this case including an identification of a selected home device 706, directed to the IMPU of the HIG 704. In response thereto, IMS UA 700b issues the SIP INVITE including the home device identification in a next step 7:5, which is received by the B2BUA 704a in HIG 704. The B2BUA 704a then authenticates the user in a step 7:6, by comparing the IMS user identity of the remote device, also being included in the SIP INVITE, with values of allowed users pre-stored in the HIG 704.

The B2BUA 704a then notifies the UPnP application 704b on the received SIP INVITE at this point, as indicated by a step 7:6a. Next, the UPnP CP in the UPnP application 704b requests a NAT binding from the UPnP function 702a in RGW 702, in a step 7:7, which is handled by the UPnP IGD, as described above for FIG. 6. The NAT binding is requested for the IP address and port number of the remote device, which are normally supplied in the SDP of the SIP INVITE, and the local IP address of the selected home device 706. Thus, HIG 704 can retrieve the local IP address of the home device 706 from its device database, using the received home device identification included in the SIP INVITE. The UPnP function 702a (IGD) in the RGW then confirms the NAT binding in a step 7:8. Hence, steps 7:7 and 7:8 represent the establishment of connection parameters of the private network as described for step 508 in FIG. 5, if the home device identification was received in the SIP INVITE above.

After the connection parameters have thus been established for communication with the home device, B2BUA 704a in HIG 704 sends a standard acknowledge message in SIP called 200 OK to the IMSUA 700b in the remote device 700, in a next step 7:9. The 200 OK message includes an SDP containing the NAT binding information with the IP address and port established for the home device 706, which the remote device can use for communicating any messages and data to or from the selected home device. In a following step 7:10, the IMSUA 700b forwards the SDP information to the HDAC 700a.

At this point, HDAC 700a may initiate the connectivity client of UPnP function 700c to establish a VPN tunnel (e.g. IPSec) to the selected home device, using the received connection parameters of the local IP address and port, in order to provide secure communication. However, no establishment of VPN tunnel is illustrated here, as it may be omitted for the present solution.

The following step 7:11 generally illustrates that the user of the remote device 700 browses for media content in the selected home device 706, using the UPnP CP. In response to a suitable input command from the user, the UPnP CP selects media on the home device by sending an HTTP GET command to the home device, in a step 7:12. The requested media content is finally sent to the UPnP function 700c of the remote device 700, in a last illustrated step 7:13. It should be noted that the communication between remote device 700 and home device 706 in steps 7:11, 7:12 and 7:13 is conveyed over RGW 702 using the established NAT binding.

In FIG. 8, valid home device information is actually not available in the remote device when the process starts, in contrast to the case of FIG. 7 described above. In a first step 8:1, the user activates the HDAC 700a, although without having selected any home device in beforehand since no home device information is available yet. The following steps 8:2 and 8:3 are basically the same as steps 7:2 and 7:3 in FIG. 7, and description thereof will not be repeated here.

Next, HDAC 700a initiates the IMS UA 700b to send an IMS SIP INVITE as a plain session invite message, in this case containing no home device identification, in a following step 8:4. IMS UA 700b then sends the SIP INVITE in a next step 8:5, to the B2BUA 704a in HIG 704. The B2BUA 704a then authenticates the user in a step 8:6, basically in the same manner as in step 7:6 in FIG. 7, and description thereof will not be repeated here.

Further, step 8:6a illustrates notification of the UPnP application 704b on the received SIP INVITE, corresponding to step 7:6a in FIG. 7. The next step 8:7 illustrates a request for NAT binding from the UPnP function 702a, which is sent from the UPnP CP in the UPnP application 704b as in step 7:7 in FIG. 7. In this case, however, a NAT binding is requested for the IP address and port number of the remote device and the local IP address of the UPnP proxy of HIG 704, since no home device has been indicated yet. A specific port number is used to reach the UPnP Proxy. The UPnP Proxy could be in the same device as HIG, i.e. having the same IP address.

Step 8:8 illustrates confirmation of the NAT binding, corresponding to step 7:8 in FIG. 7. Hence, steps 8:7 and 8:8 represent the establishment of connection parameters of the private network as described for step 512 in FIG. 5, if no home device identification was received in the SIP INVITE above.

In a next step 8:9, an acknowledgement message 200 OK is sent to IMSUA 700b, corresponding to step 7:9 in FIG. 7 and step 514 in FIG. 5. The 200 OK message includes an SDP with NAT binding information now including the IP address and port established for the UPnP Proxy in HIG 704, which the remote device can use for communicating any messages and data before selecting a home device. In a next step 8:10, the IMSUA 700b forwards the SDP information to the HDAC 700a, corresponding to step 7:10 in FIG. 7.

In a following step 8:11, the HDAC 700a initiates the connectivity client in UPnP function 700c to establish a VPN tunnel (e.g. IPSec) to the UPnP proxy in HIG 704, using the received IP address and port of that UPnP proxy. In a step 8:12, the VPN tunnel is established, as requested above. At this point, the VPN tunnel may be established according to the above-mentioned WO 2006/079891 (Nokia).

After successful VPN tunnel establishment, the UPnP Proxy in UPnP function 700c can synchronize with the UPnP Proxy in UPnP function 704b with respect to home device information, in a following step 8:13, to discover devices and services in the private network. This step thus corresponds to step 518 in FIG. 5, and to step 416 in FIG. 4. Thereby, a home device can be selected and sensitive information and data can be safely exchanged between the remote device 700 and the private network using the VPN tunnel, basically in the same manner as if the remote device was located within the private network.

The following illustrated step 8:14 of content browsing, step 8:15 of sending a data fetching command, and step 8:16 of sending requested media to the remote device 700, are executed basically in the same manner as in steps 7:11, 7:12 and 7:13 in FIG. 7, respectively, and description thereof will not be repeated here.

Figure 9A:
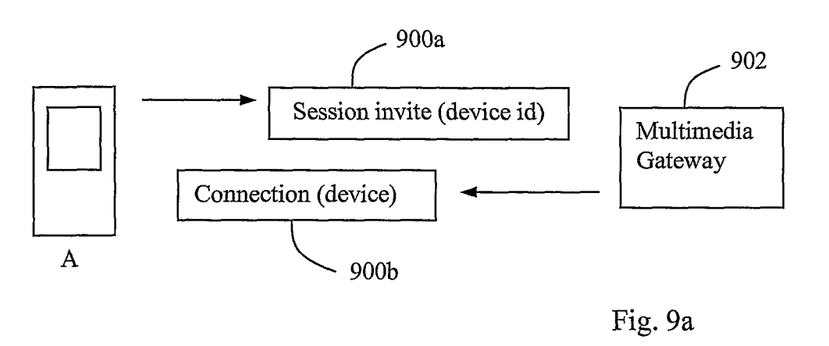
FIGS. 9a and 9b are block diagrams of a remote device A sending a session invite message to a multimedia gateway, in accordance with further embodiments.

FIG. 9a illustrates schematically that a remote device A located outside a private network sends a session invite message 900a including an identification for a selected home device, to a multimedia gateway 902. In response thereto, the multimedia gateway 902 sends connection parameters 900b associated with the selected home device to the remote device A.

Figure 9B:
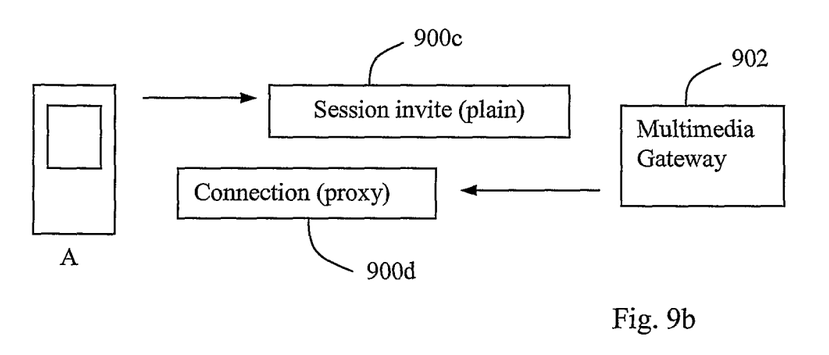

FIG. 9b illustrates schematically that the remote device A sends a plain session invite message 900c with no home device identification, to the multimedia gateway 902. In response thereto, the multimedia gateway 902 sends connection parameters 900d associated with a proxy function, to the remote device A. The proxy function is capable of providing home device information by having executed a discovery process in the private network, as described above.

By implementing the present invention according to any of the above-described embodiments, home devices in a private network can be easily and safely accessed from a remote device located outside the private network. Further, no IP address resolution functionality is necessary to use.

It is an advantage that the HDAC in the remote device interacts with the IMS part and is also "context sensitive", i.e. can detect if the device is present in the private network or not. IMS messages are used to carry selected device identities to the private network, and the HIG can make the necessary IP-address/port mapping in the RGW to enable remote access. This means that the "look and feel" of the HDAC application can be the same for the end-user, regardless of whether he/she is inside the private network or outside. Thus, it is possible to use the same device identities when being connected remotely.

Further, the present solution is "user centric", as IMS is used to find the private HIG, such that the access control is no longer tied to a device but rather to a user. This is accomplished since UPnP is not dependent of the user, being a device centric architecture, while IMS is the opposite. However, the present invention is not limited to the use of an IMS network, but can be implemented by using regular SIP messages in general for establishing the communication of media.

While the invention has been described with reference to specific exemplary embodiments, the description is in general only intended to illustrate the inventive concept and should not be taken as limiting the scope of the invention. Although the concepts of IMS, HIG and UPnP have been used throughout when describing the above embodiments, any other standards and network elements for enabling multimedia communication may basically be used. For example, SIP may be used as a general signalling protocol regardless of whether the network standards of IMS are used or not. The present invention is defined by the following independent claims.

The invention claimed is:

1. A method of accessing a home device in a private network from a remote device when located outside said private network, wherein the private network includes a multimedia gateway connected to a multimedia service network, comprising the following steps executed in the remote device:
   sending a session invite message directed to the multimedia gateway over the multimedia service network, said session invite message including an identification of a selected home device if available in the remote device,
   receiving connection parameters of a residential gateway in the private network from the multimedia gateway in response to said session invite message, wherein said connection parameters are associated with the selected home device if said home device identification was included in the session invite message, and with a proxy function in the multimedia gateway capable of providing home device information, if no home device identification was included in the session invite message,
   using the received connection parameters to communicate media with said selected home device or to obtain home device information from said proxy function;
   wherein said home device identification is included in the session invite message, if the remote device has obtained home device information in a discovery process executed previously when located inside the private network; and
   wherein if no home device identification was included in the session invite message, a VPN tunnel is established with the private network to said proxy function, and said VPN tunnel is used for synchronizing with the proxy function to obtain information on home devices in the private network.

2. A method according to claim 1, wherein the received connection parameters include a network address/port number combination that can be used for routing outside the private network.

3. A method according to claim 1, wherein the session invite message is a regular SIP INVITE message and said home device identification is included in an SDP message embedded in the SIP INVITE message, or included in a "To:" field in the SIP header.

4. A method according to claim 1, wherein the VPN tunnel is further used for communication with any selected home device.

5. A method according to claim 1, wherein the multimedia gateway is a home IMS gateway and the multimedia service network is an IMS network, and wherein both the remote device and the home IMS gateway are IMS clients.

6. A method according to claim 5, wherein the sent session invite message is directed to an IMPU of the multimedia gateway and includes an IMPU of the remote device.

7. A method according to claim 1, wherein the selected home device is a media server and the remote device receives the communicated media by means of streaming.

8. An arrangement in a remote device for accessing a home device in a private network when located outside said private network, wherein the private network includes a multimedia gateway connected to a multimedia service network, comprising a memory and a processor, the processor operable to perform steps comprising:
- sending a session invite message directed to the multimedia gateway over the multimedia service network, said session invite message including an identification of a selected home device if available in the remote device,
- receiving connection parameters of a residential gateway in the private network from the multimedia gateway in response to said session invite message, wherein said connection parameters are associated with a selected home device if a home device identification was included in the session invite message, and with a proxy function in the multimedia gateway capable of providing home device information if no home device identification was included in the session invite message,
- using the received connection parameters to communicate media with said selected home device or to obtain home device information from said proxy function;
- wherein said home device identification is included in the session invite message, if the remote device has obtained home device information in a discovery process executed previously when located inside the private network; and
- wherein if no home device identification was included in the session invite message, a VPN tunnel is established with the private network to said proxy function, and said VPN tunnel is used for synchronizing with the proxy function to obtain information on home devices in the private network.

9. An arrangement according to claim 8, wherein the received connection parameters include a network address/port number combination that can be used for routing outside the private network.

10. An arrangement according to claim 8, wherein the session invite message is a regular SIP INVITE message and said home device identification is included in an SDP message embedded in the SIP INVITE message, or included in a "To:" field in the SIP header.

11. An arrangement according to claim 8, further comprising using the VPN tunnel for communication with any selected home device.

12. An arrangement according to claim 8, wherein the multimedia gateway is a home IMS gateway and the multimedia service network is an IMS network, and wherein both the remote device and the home IMS gateway are IMS clients.

13. An arrangement according to claim 12, wherein the sent session invite message is directed to an IMPU of the multimedia gateway and includes an IMPU of the remote device.

14. An arrangement according to claim 8, wherein the home device is a media server and the remote device is adapted to receive the communicated media by means of streaming.

15. An arrangement according to claim 8, the processor operable to perform steps further comprising checking whether the remote device is currently connected to the private network or not.

16. A method of enabling access to a home device in a private network from a remote device located outside said private network, wherein the private network includes a multimedia gateway connected to a multimedia service network, comprising the following steps executed in the multimedia gateway:
- receiving a session invite message from the remote device over the multimedia service network, said session invite message including an identification of a selected home device,
- establishing connection parameters of a residential gateway in the private network for communication with the remote device,
- wherein said connection parameters are associated with the selected home device if said home device identification was included in the session invite message, and with a proxy function in the multimedia gateway capable of providing home device information, if no home device identification was included in the session invite message,
- sending the established connection parameters to the remote device in response to said session invite message;
- wherein said home device identification is included in the session invite message, if the remote device has obtained home device information in a discovery process executed previously when located inside the private network; and
- wherein if no home device identification was included in the session invite message, a VPN tunnel is established with the remote device to said proxy function, and said VPN tunnel is used for synchronizing with the remote device to provide information on home devices in the private network.

17. A method according to claim 16, wherein the established connection parameters include a network address/port number combination that can be used for routing outside the private network.

18. A method according to claim 16, wherein the received session invite message is a regular SIP INVITE message, and a 200 OK message is sent as a response with the connection parameters included either in an SDP message embedded in the 200 OK message, or included in a "To:" field in the SIP header of the 200 OK message.

19. A method according to claim 16, wherein the multimedia gateway is a home IMS gateway and the multimedia service network is an 1M3 network, and wherein both the remote device and the home 1M3 gateway are 1M3 clients.

20. An arrangement in a multimedia gateway in a private network, for enabling access to a home device from a remote device located outside said private network, the multimedia gateway being connected to a multimedia service network, comprising a memory and a processor, the processor operable to perform steps comprising:
- receiving a session invite message from the remote device over the multimedia service network, said session invite message including an identification of a selected home device,
- establishing connection parameters of a residential gateway in the private network for communication with the remote device,
- wherein said connection parameters are associated with the selected home device if said home device identification was included in the session invite message, and with a proxy function in the multimedia gateway capable of providing home device information, if no home device identification was included in the session invite message,
- sending the established connection parameters to the remote device in response to said session invite message;
- wherein said home device identification is included in the session invite message, if the remote device has obtained home device information in a discovery process executed previously when located inside the private network; and wherein if no home device identification was included in the session invite message, a VPN tunnel is established with the remote device to said proxy function, and said VPN tunnel is used for synchronizing with the remote device to obtain information on home devices in the private network.

21. An arrangement according to claim 20, wherein the established connection parameters include a network address/port number combination that can be used for routing outside the private network.

22. An arrangement according to claim 21, wherein the received session invite message is a regular SIP INVITE message, the processor operable to perform steps further comprising sending a 200 OK message as a response with the connection parameters included either in an SDP message embedded in the 200 OK message, or included in a "To:" field in the SIP header of the 200 OK message.

23. An arrangement according to claim 20, wherein the multimedia gateway is a home IMS gateway and the multimedia service network is an IMS network, and wherein both the remote device and the home IMS gateway are IMS clients.

* * * * *

UNITED STATES PATENT AND TRADEMARK OFFICE
CERTIFICATE OF CORRECTION

PATENT NO. : 8,700,784 B2  Page 1 of 1
APPLICATION NO. : 12/513106
DATED : April 15, 2014
INVENTOR(S) : Skog et al.

It is certified that error appears in the above-identified patent and that said Letters Patent is hereby corrected as shown below:

In the Claims

In Column 18, Line 41, in Claim 19, delete "an 1M3" and insert -- an IMS --, therefor.

In Column 18, Line 42, in Claim 19, delete "home 1M3 gateway are 1M3" and insert -- home IMS gateway are IMS --, therefor.

Signed and Sealed this
Second Day of September, 2014

Michelle K. Lee
*Deputy Director of the United States Patent and Trademark Office*